UNITED STATES PATENT OFFICE.

SAMUEL B. SHELDON, OF BUFFALO, NEW YORK.

PROCESS OF REFINING IRON.

No. 898,513.

Specification of Letters Patent.

Patented Sept. 15, 1908.

Application filed January 17, 1907. Serial No. 352,687.

*To all whom it may concern:*

Be it known that I, SAMUEL B. SHELDON, a citizen of the United States, and a resident of Buffalo, in the county of Erie and State of New York, have invented certain new and useful Improvements in Processes of Refining Iron; and I do hereby declare that the following is a full, clear, and exact description thereof, reference being had to the accompanying drawings, and to the letters of reference marked thereon, which form a part of this specification.

This invention relates to an improved process of refining iron for the manufacture of steel and more especially to improvements in the process by which partially refined iron, or iron which has been to a large extent previously desiliconized and decarburized, is subjected in an open hearth furnace to the action of a basic slag, for the purpose of dephosphorizing and otherwise further refining the same.

The object of the invention is to provide a process whereby the refining operation can be carried to completion in less time than is required in any of the processes heretofore used, and with a saving of materials and finished product.

My invention may be used generally in connection with any refining process in which partially refined or previously desiliconized and decarburized iron is subjected, in an open hearth furnace, to the action of a basic slag for the purpose of dephosphorizing and further refining the same. As for instance, it may be used in connection with the prior process in which pig-iron which has been previously desiliconized or pig-iron originally low in silicon, is heated in a basic open hearth furnace with scrap steel, limestone, iron-oxid in the form of scale, cinder or iron ore, and fluor spar or other flux; the pig-iron and scrap being usually used in the proportions of 50% of each. My invention may also be used in connection with what is known as the "duplex process", as now practiced, in which the molten pig-iron or iron from a blast furnace is first blown in a Bessemer or acid lined converter for the purpose of removing therefrom the silicon and a part of the carbon, and the desiliconized iron is then, in a molten condition, and with such carbon contents of the converter as may be found desirable, charged into an open hearth furnace with limestone, iron ore or other iron-oxid.

It has been proposed heretofore to carry on the general process above referred to by preparing an artificial basic slag by fusing the basic materials with iron ore, in a separate furnace, from which the molten slag is drawn and transferred to a refining furnace into which is introduced the molten iron to be treated, and it has also been proposed to retain in the open hearth furnace, after a refining operation, a part of the charge of molten metal, with a portion of the slag covering the same, to add limestone and iron-oxid to replenish the basic material in the slag and to pour molten pig-iron through the molten slag; the process in this way being made continuous. In either of these processes, except that using an artificial liquid slag prepared in a separate furnace, the charge in the open hearth furnace must be subjected to the action of heat for a considerable period of time because of the time required to first effect fusion of the limestone and iron oxid and to then produce reaction between the basic materials and the phosphorus in the metal, by which the phosphorus combines with the basic elements of the slag in the form of a phosphate, and other impurities are oxidized, it being necessary to complete the fusion of the basic materials and the formation of the slag before the dephosphorization and oxidation can take place.

In carrying out the refining process as above described it has been customary to retain the refined metal with some of the slag in the ladle when the heat is tapped or run from the furnace and about 50% of the slag is allowed to run over the edge of the ladle into a mold; the remainder being retained and dumped from the ladle after the metal is poured therefrom. The portion of the slag run into the mold is afterwards used in a blast furnace while that retained in the ladle is dumped upon the slag pile as waste. The slag thus thrown away contains from 2% to 4% of what is known as "shotted" metal, and a large proportion of basic material, all of which has been wasted.

In carrying out my improved process I proceed as follows: An initial charge is prepared in an open hearth furnace by introducing therein materials necessary for forming the basic slag and the iron to be treated.

The iron may be pig-iron naturally low in silicon, or iron which has been previously desiliconized and partially decarburized by treatment in a Bessemer converter or in an open hearth furnace. If proceeding according to the so-called "duplex" process, the iron will be transferred while in a molten condition from the converter, together with some slag from the Bessemer blow if desirable.

At the end of the refining operation the furnace is tapped and a portion of the slag allowed to run over the top of the ladle which receives it, this amount being about 50% of the slag made in the heat. The slag which is so allowed to run over the top of the ladle is, while still in a molten condition, poured into an auxiliary furnace adapted to receive it. To the slag so transferred into the auxiliary furnace is added lime in sufficient quantity to supply the amount of basic material needed for a subsequent operation, together with enough fluor spar or other flux to maintain the slag in liquid condition. Heat is applied to the auxiliary furnace so far as is necessary to keep the contents thereof in a molten condition and in readiness for use in the refining furnace. In practice it is intended to maintain the auxiliary furnace full of this slag, or that it shall contain enough slag for a number of heats. The slag so prepared in the auxiliary furnace is drawn out in proper amount for a heat and transferred to the refining furnace. The desiliconized iron is then charged into the refining furnace and another heat is carried on as before; about 50% of the slag resulting from the heat being reserved and returned to the auxiliary furnace and a proportionate quantity of fresh basic material therein added to it, while the remaining 50% is kept for use in a blast furnace.

The basic slag prepared in the auxiliary furnace by the addition of fresh basic materials to the molten slag reserved from each heat in the open hearth furnace is maintained in a suitably basic condition by the addition of lime in proportion depending upon the quantity of silicon in the original pig-iron. The quantity of slag needed for a given heat also varies by the amount of phosphorus and sulfur to be removed from the iron.

The advantages gained by my process are a saving of the lime contents of the initial slag; the saving of the initial heat of the slag; the maintenance in condition for use of a quantity of dephosphorizing slag, whereby is saved the time and heat necessary to burn in the refining furnace the limestone which, in the basic process ordinarily used, is added to the basic bath; the ability to have the hearth of the refining furnace covered with slag, thereby protecting it from the action of the metal, the saving of time and expense due to the lessened destruction of the refractory lining of the refining furnace and the increased rapidity of the entire operation, resulting in an increased product from the refining furnace in a given period of time.

In applying my invention to what is known as the "duplex" process, the volume of slag required is smaller than in other cases for several reasons. In this case the prepared slag is drawn from the auxiliary furnace in proper amount and placed in the refining furnace. The molten metal from the converter is then poured through this slag, producing an immediate and rapid dephosphorizing and deoxidizing action. By reason of the comparatively high temperature of the molten metal as it is delivered to the refining furnace and the oxidizing condition of the slag coming from the converter, the operation is very rapid, resulting in a largely increased product as compared with the processes in which cold pig-iron and scrap, or molten pig-iron, are introduced into the converter. Furthermore, when my improved process is employed as above described, "shotted" metal contained in the slag at the end of the refining operation gradually accumulates in the hearth of the auxiliary furnace, and being practically carbonless remains on the bottom of the hearth in a plastic or pasty condition. When this refined iron has accumulated in sufficient amount, molten pig-iron is poured into the auxiliary furnace, which causes the recarbonization of said refined iron and it is then liquefied and poured into a ladle, transferred to a steel furnace, and made into finished steel. My process therefore enables this appreciable quantity of "shotted" metal, which is now ordinarily thrown away with the slag, to be saved.

My process differs from the prior one in which an artificial slag is prepared in an auxiliary furnace, for the reason that in said prior process there is no attempt to utilize the initial heat of the slag from a preceding heat in the refining furnace or to recover the shotted metal in the slag from the refining furnace. Ordinarily the only use made of basic open hearth slag is to work a certain portion thereof through a blast furnace. This, of course, has a tendency to increase the phosphorus in the pig-iron, and the practice is to work the slag in a specific furnace making pig-iron for the open hearth process, for a week and omit its use in such furnace for a succeeding week; this amounting practically to the utilization of 50% of the amount of slag made. According to my process, all of the slag made could be utilized, 50% thereof in preparing the slag for a subsequent heat and the remaining 50% in the blast furnace.

The saving in speed in the operation, arising from the avoidance of the necessity of spending time to make a fresh slag for each charge, together with the saving of the lime contents of the slag, affords an important advantage over prior processes. The advantage of my process when used in connection with the "duplex" process, is very great, because the operation in that case can be carried out in a very short time, owing to the rapidity of the reaction due to the introduction of the molten metal from the converter into the charge of highly heated liquid slag, and the saving of time resulting from the introduction into the refining furnace, in readiness for the refining operation, of the liquid basic slag previously prepared in the auxiliary furnace.

I claim as my invention:—

1. The improvement in the art of refining iron which consists in transferring to an auxiliary furnace a part of the slag remaining at the end of a refining operation, adding fresh basic material to the slag in said auxiliary furnace in quantities sufficient to maintain uniform basic efficiency, applying heat to the slag in such auxiliary furnace to fuse the added basic material and keep the slag in a molten condition and transferring slag from said auxiliary furnace, while still in a molten condition, into a refining furnace, to be used as part of the charge for another refining operation.

2. The improvement in the art of refining iron which consists in transferring to an auxiliary furnace slag remaining at the end of a refining operation, adding fresh basic material to the slag in such auxiliary furnace in quantities sufficient to maintain uniform basic efficiency, applying heat to the slag in such auxiliary furnace to fuse the fresh basic material and keep the slag therein in a molten condition, transferring a part of the slag from said auxiliary furnace into a refining furnace as the charge for another refining operation, and adding unrefined or partially refined pig-iron or steel in a molten state to the slag in said refining furnace.

3. The improvement in the art of refining iron which consists in transferring to an auxiliary furnace slag remaining at the end of a refining operation, adding fresh basic material to the slag in said auxiliary furnace, applying heat to the slag in said auxiliary furnace to fuse the added basic material and keep the slag in a molten condition, allowing the shotted metal in said slag to accumulate in said auxiliary furnace, transferring slag from said auxiliary furnace while still in a molten condition into a refining furnace to be used as part of the charge for another refining operation, and adding pig metal in liquid or solid form to the shotted metal which accumulates in said auxiliary furnace.

4. The improvement in the art of refining iron which consists in transferring to a blast furnace a portion of the slag remaining at the end of a refining operation, transferring to an auxiliary furnace another part of such slag, adding to the slag in said auxiliary furnace fresh additions of basic material in quantity sufficient to maintain uniform basic efficiency, applying heat to the slag in such auxiliary furnace to fuse the added basic materials and keep the slag in molten condition, and transferring slag from said auxiliary furnace to a refining furnace for use in another refining operation.

In testimony, that I claim the foregoing as my invention I affix my signature in the presence of two witnesses, this 12th day of January A. D. 1907.

SAMUEL B. SHELDON.

Witnesses:
A. C. BYAM,
A. H. VOGEL.